United States Patent [19]

Kan et al.

[11] 3,998,766

[45] Dec. 21, 1976

[54] URETHANE MODIFIED CARBODIMIDE-ISOCYANURATE FOAMS FROM ORGANIC POLYISOCYANATES AND OXYALKYLATED MANNICH POLYOLS

[75] Inventors: Peter T. Kan, Plymouth; Moses Cenker, Trenton; John T. Patton, Jr., Wyandotte, all of Mich.

[73] Assignee: BASF Wyandotte Corporation, Wyandotte, Mich.

[22] Filed: Dec. 26, 1974

[21] Appl. No.: 536,605

[52] U.S. Cl. .................. 260/2.5 AQ; 260/2.5 AW; 260/2.5 BF
[51] Int. Cl.² .................. C08G 18/14; C08G 18/50
[58] Field of Search .............. 260/2.5 BF, 2.5 AW, 260/2.5 AQ

[56] References Cited
UNITED STATES PATENTS

| | | | |
|---|---|---|---|
| 3,186,969 | 1/1965 | Cox | 260/2.5 AQ |
| 3,297,597 | 1/1967 | Edwards | 260/2.5 AQ |
| 3,620,986 | 11/1971 | Diehr | 260/2.5 BF |
| 3,671,470 | 6/1972 | Case | 260/2.5 AQ |
| 3,725,319 | 4/1973 | Frisch | 260/2.5 AJ |
| 3,745,133 | 7/1973 | Comunale | 260/2.5 AW |

*Primary Examiner*—C. Warren Ivy
*Attorney, Agent, or Firm*—Joseph D. Michaels; Bernhard R. Swick; Robert E. Dunn

[57] ABSTRACT

Rigid cellular foam compositions characterized by carbodiimide, isocyanurate and urethane linkages are prepared by the reaction of an organic polyisocyanate with certain oxyalkylated Mannich polyols employing an NCO/OH equivalent ratio of from about 2:1 to 10:1. The use of the oxyalkylated Mannich polyols in the amounts stated eliminates the need for carbodiimide and isocyanurate promoting catalysts.

5 Claims, No Drawings

URETHANE MODIFIED CARBODIIMIDE-ISOCYANURATE FOAMS FROM ORGANIC POLYISOCYANATES AND OXYALKYLATED MANNICH POLYOLS

BACKGROUND OF THE INVENTION

1. Field Of The Invention

The present invention relates to the preparation of rigid cellular foam compositions characterized by carbodiimide, isocyanurate and urethane linkages. More particularly, the invention relates to the preparation of foam compositions by the reaction of an organic polyisocyanate with certain oxyalkylated Mannich polyols employing an NCO/OH equivalent ratio of from about 2:1 to 10:1.

2. Prior Art

The preparation of foams containing carbodiimide linkages is well known in the art. Generally, the foams are prepared by condensing an organic polyisocyanate with a catalyst which promotes carbodiimide linkages, optionally in the presence of a blowing agent. Representative of such teachings are the disclosures found in U.S. Pats. Nos. 2,941,966 and 3,645,923. The prior art also teaches that foams containing both carbodiimide and isocyanurate linkages can be prepared by condensing an organic polyisocyanate with a catalyst which promotes both carbodiimide and isocyanurate linkages or with a co-catalyst system, one catalyst promoting carbodiimide linkages and one catalyst promoting isocyanurate linkages. Representative of such teachings are the disclosures found in U.S. Pat. Nos. 3,645,923; 3,657,161; 3,717,596; 3,723,366, and 3,746,709.

SUMMARY OF THE INVENTION

The present invention relates to an improved process for the preparation of foams characterized by carbodiimide, isocyanurate and urethane linkages which comprises reacting an organic polyisocyanate with certain oxyalkylated Mannich polyols employing an NCO/OH equivalent ratio of from about 2:1 to 10:1. The process of the subject invention eliminates the need for special catalysts which promote the carbodiimide and/or isocyanurate reactions. Moreover, the foams prepared are self-blown, thereby eliminating the need for additional blowing agents.

DESCRIPTION OF THE PREFERRED EMBODIMENTS

In accordance with the process of the present invention, rigid cellular foams are prepared by the reaction of an organic polyisocyanate with an oxyalklated Mannich polyol employing an NCO/OH equivalent ratio of from about 2:1 to 10:1. The resulting foams are characterized by carbodiimide, isocyanurate and urethane linkages.

The oxyalkylated Mannich polyols of use in the present invention have a hydroxyl number of from 100 to 900 and a nitrogen content of from 1% to 15% by weight. The polyols are prepared by the reaction of an alkylene oxide with Mannich condensation products of a phenolic compound with formaldehyde and a primary or secondary aliphatic amine or alkanolamine. Mannich condensation products of a phenolic compound with formaldehyde and a primary or secondary aliphatic amine or alkanolamine are well known in the art. The preparation of these condensation products is described in U.S. Pat. Nos. 3,297,597 and 3,436,373.

Phenolic compounds which are employed in the Mannich condensation are aromatic compounds containing one or more hydroxyl groups attached directly to the aromatic nucleus and having a hydrogen atom on one or more of the ring positions ortho and para to the hydroxyl group and which is otherwise unsubstituted or substituted with substituent groups which are non-reactive under Mannich reaction conditions. Substituent groups that may be present include alkyl, cycloalkyl, aryl, halo, nitro, carboalkoxy, haloalkyl and hydroxyalkyl. The phenolic compound is further characterized by a molecular weight within the range of from about 94 to about 500. Examples of acceptable phenolic compounds include phenol, o-, m- or p-cresols, ethylphenol, nonylphenol, p-phenylphenol, 2,2-bis(4-hydroxyphenyl)propane, β-naphthol, β-hydroxyanthracene, p-chlorophenol, o-bromophenol, 2,6-dichlorophenol, p-nitrophenol, 4-nitro-6-phenylphenol, 2-nitro-4-methylphenol, 3,5-dimethylphenol, p-isopropylphenol, 2-bromo-4-cyclohexylphenol, 2-methyl-4-bromophenol, 2-(2-hydroxypropyl)phenol, 2-(4-hydroxyphenol)ethanol, 2-carbethoxyphenol and 4-chloromethylphenol.

Amines and alkanolamines which may be reacted with the phenolic compound and formaldehyde may be represented by the formula:

where $a$ is 1 or 2 and R is alkyl, hydroxyalkyl, cycloalkyl, cycloalkenyl, aralkyl, amino, aminoalkyl, aryloxyalkyl, alkenyl, heterocyclylalkyl, and the like, wherein the amine has up to about 18 carbon atoms. Specific illustrative amines include mono- and di- methylamine, ethylamine, butylamine, 2-ethylhexylamine, decylamine, octadecylamine, ethylenediamine, diethylenetriamine, benzylamine, allylamine, ethanolamine, isopropanolamine, bis(2-hydroxypropyl)-amine, hydroxyethylmethylamine, N-hydroxyethylpiperazine, N-hydroxybutylamine, N-hydroxyethyl-2,5-dimethylpiperazine, and the like.

Formaldehyde may be employed in the Mannich reaction in any of its conventional forms, such as an aqueous formalin solution, an "inhibited" methanol solution, paraformaldehyde or trioxane.

The characteristics of the Mannich product and consequently the characteristics of the alkylene oxide adduct of the Mannich product may be varied over wide limits by proper choice of the phenolic compound and alkanolamine employed and by varying the molar ratios of the reactants. For example, if phenol, diethanolamine and formaldehyde are employed in a molar ratio of 1:3:3, the predominant product will have seven hydroxyl groups attached to a single molecule. If the molar ratio of these same reactants is changed to 1:2:2, a pentol will be obtained as the predominant product. Similarly, when the molar ratio is 1:1:1, a triol is the predominant product.

If an excess of formaldehyde is used in the preparation of the triol or pentol, the Mannich reaction becomes complex due to the secondary condensation of phenol and formaldehyde. This is the well-known Novolak reaction which leads to polymethylene derivatives of phenol. For example, when phenol, diethanolamine and formaldehyde are reacted in the molar ratio of 1:1:2, the normal Mannich reaction occurs in one of the three active phenol positions. This leaves two available active positions on the phenol nucleus to undergo condensation with the excess formaldehyde. The presence of the amine groups affords sufficient base catalysis to promote the phenol-formaldehyde condensation leading to a complex reaction product.

The Mannich reaction product is reacted with an alkylene oxide to provide the final polyol. The nitrogen present in the Mannich condensate has sufficient catalytic activity to promote the reaction of one mole of the alkylene oxide with each free amino hydrogen atom and phenolic and primary hydroxyl group and no additional catalyst is needed. The alkoxylation is conducted at a temperature of about 30° C. to about 200° C. For example, seven moles of propylene oxide will add to the Mannich product prepared from a molar ratio of 1:3:3 of phenol, diethanolamine and formaldehyde to give a heptol.

It is, of course, possible to add less than one mole of alkylene oxide per free phenolic and primary hydroxyl group in the Mannich condensation product. The minimum desirable amount of alkylene oxide is one mole per free amino hydrogen atom and phenolic hydroxyl group. In general, phenolic hydroxyl groups form unstable urethane linkages and so are to be avoided where practical. Since phenolic hydroxyl groups are more reactive than alcoholic hydroxyl groups, the phenolic hydroxyl groups will react with the alkylene oxide first, thereby assuring reaction of the phenolic hydroxyl groups when less than the stoichiometric amount of alkylene oxide is used. Generally, more than the minimum amount of alkylene oxide is used to obtain a product having a lower hydroxyl number and lower viscosity. For example, a desirable product is that obtained by the addition of five moles of propylene oxide (rather than the maximum of seven or minimum of one) to the heptol obtained by the Mannich condensation of phenol, formaldehyde and diethanolamine in a mole ratio of 1:3:3.

Examples of alkylene oxides that can be used include ethylene oxide, propylene oxide, butylene oxide, styrene oxide, glycidol, and heteric or blocked mixtures thereof. The alkylene oxide of choice of the present invention is propylene oxide.

The following oxyalkylated Mannich polyols are preferred polyols of use in the subject invention:

Polyol A — a polyol having a hydroxyl number of 530 prepared by the reaction of propylene oxide with the Mannich condensation product of formaldehyde, diethanolamine and phenol (nitrogen content of 4.17% by weight).

Polyol B — a polyol having a hydroxyl number of 450 prepared by the reaction of propylene oxide with a mixture of the Mannich condensation product of formaldehyde, diethanolamine and phenol (nitrogen content of 6.3% by weight).

The organic polyisocyanate used in the preparation of the foams in accordance with the present invention corresponds to the formula:

wherein R'' is a polyvalent organic radical which is either aliphatic, aralkyl, alkaryl, aromatic or mixtures thereof, and z is an integer which corresponds to the valence of R'' and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, 2,4,6-toluene triisocyanates; the aromatic tetraisocyanates, such as 4,4'-dimethyldiphenylmethane-2,2'-5,5'-tetraisocyanate and the like, arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasi-prepolymers". These quasi-prepolymers are prepared by reacting an excess of organic polyisocyanate or mixtures thereof with a minor amount of an active hydrogen containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl terminated polyesters, polyalkylene ether polyols, hydroxyterminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

In addition to the above two ingredients, a catalytic amount of a urethane-promoting catalyst may be employed in the process of the subject invention. These catalysts are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. Preferred urethane-promoting catalysts are the tin salts of carboxylic acids, such as dibutyltin dilaurate and dibutyltin diacetate. Generally, the amount of the urethane-promoting catalyst employed will be from 0.01 part to 10 parts per 100 parts of organic polyisocyanate.

The carbon dioxide-blown foams of the present invention are prepared by mixing together the organic polyisocyanate, the polyol and the urethane-promoting catalyst, if employed, at an initiating temperature which, depending on the catalyst, will range from about 0° C. to 50° C., generally at room temperature. Under such conditions almost immediately an exotherm is developed within the reaction system, carbon dioxide is generated, and foam formation begins.

The present invention also contemplates the incorporation of additional ingredients in the foam formulation to tailor the properties thereof. Thus, plasticizers, such as tris(2-chloroethyl) phosphate and surfactants, such as the silicone surfactants, e.g., alkylpolysiloxanes and polyalkylsiloxanes, may be employed in the invention. Further additional ingredients include auxiliary or supplemental blowing agents, such as water or halohydrocarbons, and inorganic fillers, pigments and the like can be used.

In any event, the foams prepared in accordance herewith are rigid cellular products having a density of from about one pound to forty pounds per cubic foot which exhibit excellent flame properties, such as fire resistance, low smoke evolution, and excellent weight retention.

Following are specific, non-limiting examples which are provided to illustrate the enumerated principles described herein. All parts are by weight unless otherwise indicated.

EXAMPLES 1–17

A series of foams was prepared by the addition of an oxyalkylated Mannich polyol to a mixture of 80/20 percent by weight of a mixture of 2,4-, 2,6-toluene diisocyanate. All the reactions were carried out at room temperature and commenced within one minute of the addition. In those instances in which a urethane catalyst was employed, the catalyst was added to the diisocyanate prior to the addition of the polyol. Specific details of the preparations including the amounts of the ingredients employed are presented in Table I, below. The absorption peaks were determined by infrared analysis. In Table I, the following abbreviations are employed:

Polyol A — as described supra
TDI — 80/20 percent by weight of a mixture of 2,4-, 2,6-toluene diisocyanate
DBTDL — dibutyltin dilaurate
St.Oct. — stannous octoate From the data presented in Table I, it is clear that only those foams prepared employing an equivalent ratio of NCO/OH of from 2:1 or higher exhibited carbodiimide, isocyanurate and urethane linkages. Foams prepared employing and equivalent ratio of NCO/OH of 1:1 did not exhibit either isocyanurate or carbodiimide linkages.

TABLE I

| Examples | TDI, parts | Polyol A, Parts | Equiv. Ratio | DBTDL Parts | St.Oct. Parts | IR[1] of Foam | | | |
|---|---|---|---|---|---|---|---|---|---|
| | | | | | | —NCO | —NH-COO— | Trimer | —N=C=N— |
| 1 | 209 | 50.9 | 5 | — | — | s | m | m | w |
| 2 | 209 | 63.6 | 4 | — | — | s | m | m | m |
| 3 | 209 | 84.8 | 3 | — | — | s | s | s | s |
| 4 | 209 | 127.2 | 2 | — | — | w | s | s | s |
| 5 | 209 | 254.4 | 1 | — | — | vw | s | — | — |
| 6 | 209 | 42.4 | 6 | 3 | — | s | s | s | s |
| 7 | 209 | 50.9 | 5 | 3 | — | s | s | s | s |
| 8 | 209 | 63.6 | 4 | 3 | — | s | s | s | s |
| 9 | 209 | 84.8 | 3 | 3 | — | s | s | s | s |
| 10 | 209 | 127.2 | 2 | 3 | — | m | s | s | s |
| 11 | 209 | 254.4 | 1 | 3 | — | vw | s | — | — |
| 12 | 209 | 42.4 | 6 | — | 3 | s | s | m | — |
| 13 | 209 | 50.9 | 5 | — | 3 | s | s | s | m |
| 14 | 209 | 63.6 | 4 | — | 3 | s | s | s | m |
| 15 | 209 | 84.8 | 3 | — | 3 | s | s | s | s |
| 16 | 209 | 127.2 | 2 | — | 3 | s | s | s | s |
| 17 | 209 | 254.4 | 1 | — | 3 | vw | s | — | — |

[1]Absorption Peaks (s = strong, m = medium, w = weak, vw = very weak)

EXAMPLES 18–29

Following the procedure described in the previous examples, a series of foams was prepared by the reaction of an organic polyisocyanate with certain oxyalkylated Mannich polyols. An NCO/OH equivalent ratio of 2:1 was employed in all of the preparations. In Table II, below, the following abbreviations are employed:

Polyol A — as described supra
Polyol B — as described supra
TDI — 80/20 percent by weight of a mixture of 2,4-, 2,6-toluene diisocyanate
MDI — methylene diphenyl diisocyanate
DBTDL — dibutyltin dilaurate
DBTDA — dibutyltin diacetate

TABLE II

| Example | Polyisocyanate Parts | | Polyol, Parts | | DBTDL Parts | DBTDA Parts | Butler Chimney Test | |
|---|---|---|---|---|---|---|---|---|
| | TDI | MDI | | | | | Wt. Ret. % | Flame Ht. In. |
| 18 | 209 | — | A | 127.2 | — | — | 46 | 10 |
| 19 | 209 | — | A | 127.2 | 3 | — | 32 | 10 |

TABLE II-continued

| Example | Polyisocyanate Parts TDI | Polyisocyanate Parts MDI | Polyol, | Parts | DBTDL Parts | DBTDA Parts | Butler Chimney Test Wt. Ret. % | Butler Chimney Test Flame Ht. In. |
|---|---|---|---|---|---|---|---|---|
| 20 | 209 | — | A | 127.2 | — | 3 | 38 | 10 |
| 21 | 209 | — | B | 148.8 | — | — | 46 | 10 |
| 22 | 209 | — | B | 148.8 | 3 | — | 38 | 10 |
| 23 | 209 | — | B | 148.8 | — | 3 | 39 | 10 |
| 24 | 174 | 39.6 | A | 127.2 | — | — | 56 | 10 |
| 25 | 174 | 39.6 | A | 127.2 | 3 | — | 29 | 10 |
| 26 | 174 | 39.6 | A | 127.2 | — | 3 | 30 | 10 |
| 27 | 174 | 39.6 | B | 148.8 | — | — | 37 | 10 |
| 28 | 174 | 39.6 | B | 148.8 | 3 | — | 34 | 10 |
| 29 | 174 | 39.6 | B | 148.8 | — | 3 | 22 | 10 |

The embodiments of the invention in which an exclusive property or privilege is claimed are defined as follows:

1. A process for the preparation of a foam characterized by carbodiimide, isocyanurate and urethane linkages which comprises reacting in the absence of a catalyst which promotes the carbodiimide or isocyanurate reactions an organic polyisocyanate with an oxyalkylated Mannich polyol having a hydroxyl number of from 100 to 900 and a nitrogen content of from 1% to 15% by weight employing an NCO/OH equivalent ratio of from about 2:1 to 10:1.

2. The process of claim 1 wherein the organic polyisocyanate is selected from the group consisting of toluene diisocyanate, methylene diphenyl diisocyanate, polyphenyl polymethylene polyisocyanate and mixtures thereof.

3. The process of claim 1 conducted in the presence of a urethane-promoting catalyst.

4. The process of claim 3 wherein the urethane-promoting catalyst is dibutyltin dilaurate.

5. The process of claim 1 wherein the polyol is prepared by the reaction of propylene oxide with the Mannich condensation product of formaldehyde, diethanolamine and phenol.

* * * * *